United States Patent
Buckley

(10) Patent No.: US 7,610,014 B2
(45) Date of Patent: Oct. 27, 2009

(54) SYSTEM AND METHOD FOR SELECTING A CELLULAR NETWORK ON A WIRELESS LOCAL AREA NETWORK

(75) Inventor: Adrian Buckley, Brentwood, CA (US)

(73) Assignee: Research In Motion Limited, Waterloo (CA)

( * ) Notice: Subject to any disclaimer, the term of this patent is extended or adjusted under 35 U.S.C. 154(b) by 734 days.

(21) Appl. No.: 10/752,802

(22) Filed: Jan. 7, 2004

(65) Prior Publication Data
US 2005/0148299 A1 Jul. 7, 2005

(51) Int. Cl.
*H04B 7/00* (2006.01)
*H04W 4/00* (2009.01)

(52) U.S. Cl. .................... 455/41.2; 455/422.1
(58) Field of Classification Search ........... 455/41.2, 455/436–439, 432.3, 435.2, 435.3, 432.1, 455/411, 435.1, 422.1, 524, 525, 434, 552.1; 370/328–335; 713/201
See application file for complete search history.

(56) References Cited

U.S. PATENT DOCUMENTS

| | | | | |
|---|---|---|---|---|
| 5,734,980 | A * | 3/1998 | Hooper et al. | 455/434 |
| 6,735,443 | B2 * | 5/2004 | Chandra et al. | 455/436 |
| 2003/0119481 | A1 | 6/2003 | Haverinen et al. | |
| 2003/0134650 | A1 * | 7/2003 | Sundar et al. | 455/465 |
| 2003/0233580 | A1 * | 12/2003 | Keeler et al. | 713/201 |
| 2004/0066756 | A1 * | 4/2004 | Ahmavaara et al. | 370/328 |
| 2004/0077374 | A1 * | 4/2004 | Terry | 455/552.1 |
| 2004/0092259 | A1 | 5/2004 | Blanc et al. | |
| 2005/0094593 | A1 * | 5/2005 | Buckley | 370/328 |
| 2005/0153684 | A1 * | 7/2005 | Rodrigo | 455/411 |

FOREIGN PATENT DOCUMENTS

| | | |
|---|---|---|
| JP | 2002-157181 | 5/2002 |
| JP | 2003-304262 | 10/2003 |
| KR | 2003-0019336 | 3/2003 |
| KR | 2003-0086615 | 11/2003 |
| WO | WO 01/76134 A1 | 10/2001 |
| WO | WO 02/080607 A1 | 10/2002 |
| WO | 2003/090013 A2 | 10/2003 |

(Continued)

OTHER PUBLICATIONS

Hsieh, H. et al.: "Internetworking WWANs and WLANs in Next Generation Wireless Data Networks," GNAN Research Group, School of Electrical and Computer Engineering, Georgia Institute of Technology (6 pages).

(Continued)

*Primary Examiner*—Melody Mehrpour
(74) *Attorney, Agent, or Firm*—Jones Day; Krishna K. Pathiyal; Robert C. Liang

(57) ABSTRACT

In accordance with the teachings described herein, systems and methods are provided for selecting a cellular network on a wireless local area network (WLAN). A network list may be used to identify a plurality of preferred WLANs and one or more cellular networks that may be accessed via the preferred WLANs. A cellular network may be selected by using the network list to identify the cellular network(s) that may be accessed via the preferred WLANs within coverage range of a mobile device. A WLAN may then be selected based on its access to a most-preferred of the available cellular networks.

20 Claims, 5 Drawing Sheets

FOREIGN PATENT DOCUMENTS

WO     WO 2004/064307 A2     7/2004

OTHER PUBLICATIONS

Luo, H. et al.: "Internet Roaming: A WLAN/3G Integration System for Enterprises," AT&T Labs—Research, Middletown, NJ, USA (11 pages).

3RD Generation Partnership Project: Technical Specification Group Services and System Aspects, Feasibility Study on 3GPP System to Wireless Local Area Network (WLAN) Interworking (Release 6), 3GPP TR 22.934 V6.2.0 (Sep. 2003) (manual).

3RD Generation Partnership Project: Technical Specification Group Services and System Aspects, 3GPP System to Wireless Local Area Network (WLAN) Interworking; System Description (Release 6), 3GPP TS 23.234 V2.3.0 (Nov. 2003) (manual).

3RD Generation Partnership Project: Technical Specification Group Services and System Aspects, Feasibility Study on 3GPP System to Wireless Local Area Network (WLAN) Interworking (Release 6), 3GPP TR 22.934 V6.1.0 (Dec. 2002) (manual).

3RD Generation Partnership Project: Technical Specification Group Services and System Aspects, 3GPP System to Wireless Local Area Network (WLAN) Interworking; System Description (Release 6), Draft 3GPP TS 23.234 V1.10.0 (May 2003) (manual).

Ahmavaara et al.: "Interworking Architecture Between 3GPP and WLAN Systems," IEEE Communications Magazine, vol. 41, No. 11, Nov. 2003.

Translation of Notice of Reasons for Rejection dated Dec. 12, 2007 (mailed Dec. 14, 2007) for Japanese Appln. No. 2005-3237.

\* cited by examiner

| | | | |
|---|---|---|---|
| WLAN 1 | VISITED NETWORK 1 | NTW ID-1 | PREFERRED |
| | VISITED NETWORK 2 | NTW ID-2 | PREFERRED |
| WLAN 2 | HOME NETWORK | HOME NTW ID | HOME |
| | VISITED NETWORK 3 | NTW ID-3 | NON-PREFERRED |
| WLAN 3 | VISITED NETWORK 3 | NTW ID-3 | NON-PREFERRED |
| WLAN 4 | NONE | | |
| ⋮ | | | |
| WLAN N | | | |

Fig. 2

SYSTEM AND METHOD FOR SELECTING A CELLULAR NETWORK ON A WIRELESS LOCAL AREA NETWORK

FIELD

The technology described in this patent document relates generally to the fields of cellular networks and wireless local area networks (WLANs). More particularly, the patent document describes a system and method for selecting a cellular network on a WLAN.

BACKGROUND

A system for integrating a third generation (3G) cellular network with a WLAN has been proposed by the $3^{rd}$ Generation Partnership Project (3GPP) in the standards document 3GPP TS 23.234, entitled "3GPP system to Wireless Local Area Network (WLAN) Interworking; System Description (Release 6)," which is incorporated herein by reference.

SUMMARY

In accordance with the teachings described herein, systems and methods are provided for selecting a cellular network on a wireless local area network (WLAN). A network list may be used to identify a plurality of preferred WLANs and one or more cellular networks that may be accessed via the preferred WLANs. A cellular network may be selected by using the network list to identify the cellular network(s) that may be accessed via the preferred WLANs within coverage range of a mobile device. A WLAN may then be selected based on its access to a most-preferred of the available cellular networks.

BRIEF DESCRIPTION OF THE DRAWINGS

FIG. 2 illustrates an example WLAN list that may be maintained on user equipment;

DETAILED DESCRIPTION

Figure 1:
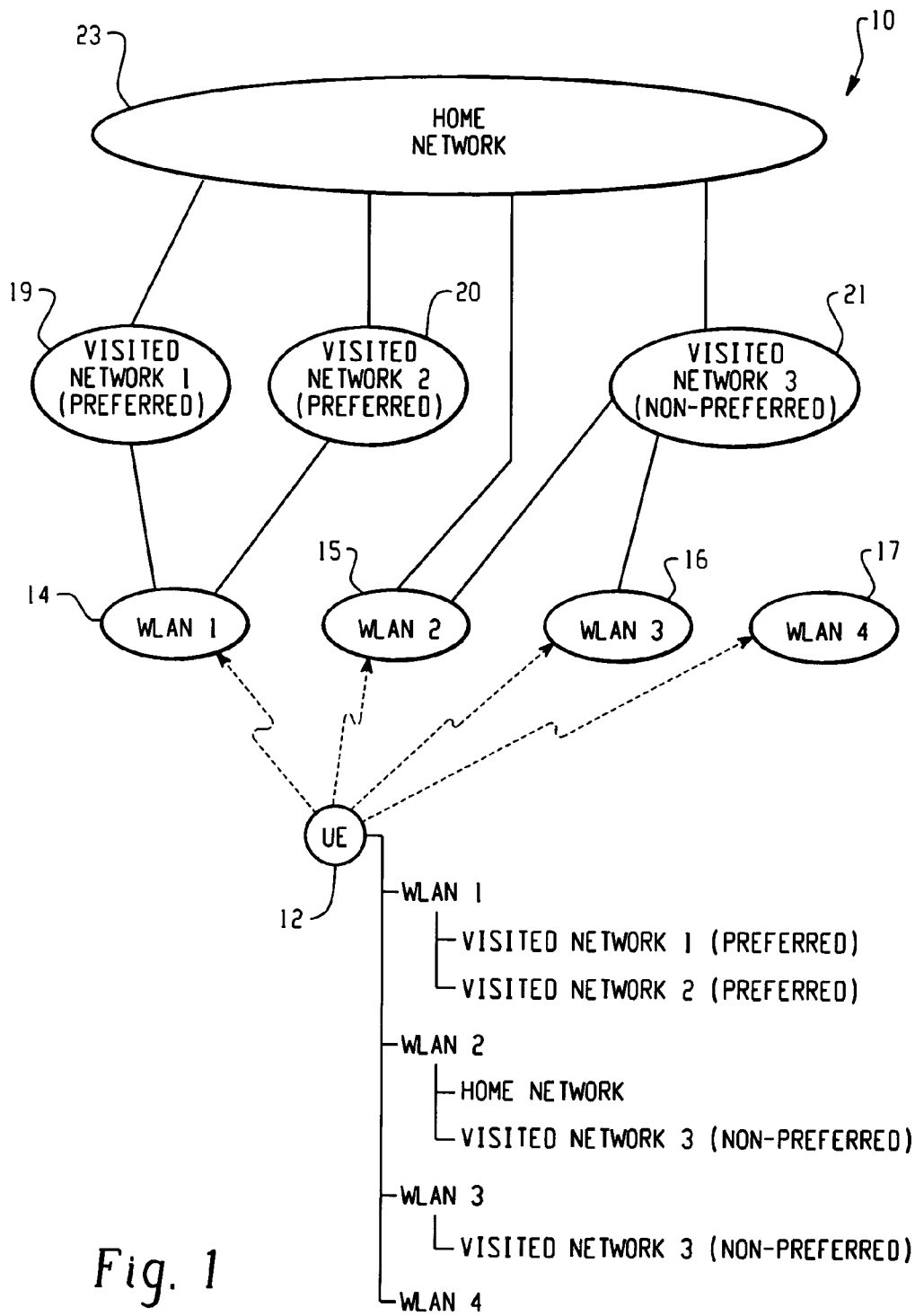
FIG. 1 is a diagram illustrating an example system for selecting a cellular network on a WLAN.

With reference now to the drawing figures, FIG. 1 is a diagram illustrating an example system for selecting a cellular network on a WLAN. The system includes user equipment 12 for accessing a wireless network having a plurality of WLANs 14-17 that are networked with a plurality of cellular networks 19-21, 23. The user equipment 12 is preferably a mobile device, such as a cellular telephone, a wireless-enabled personal digital assistant (PDA), a two-way pager, a wireless-enabled laptop computer, or other such devices. The WLANs 14-17 may, for example, be IEEE 802.11b networks, Bluetooth networks, or other types of short-range radio technologies. The cellular networks 19-21, 23 are preferably third generation (3G) cellular networks, such as UMTS (Universal Mobile Telecommunication System) networks, but could also include other types of cellular networks, such as GSM networks, GPRS networks, or others.

The cellular networks 19-21, 23 that may be accessed by the user equipment 12 are each designated as either a home network (e.g., HPLMN) or as a visited network (e.g., VPLMN). The home network 23 for the user equipment 12 is the cellular network that maintains subscription information for the user equipment 12, and the visited networks 19-21 are cellular networks having roaming agreements with the home network 23. Thus, the user equipment 12 may obtain cellular access through either the home network 23 or any visited network 19-21. In addition, the visited networks 19-21 may include preferred networks 19, 20 that have a preferred roaming agreement with the home network 23 and other, non-preferred networks 21. Cellular networks that may not be accessed by the user equipment 12 (e.g., cellular networks that do not have roaming agreements with the home network 23) may also be included in the wireless network, but are not illustrated in FIG. 1 for simplicity.

The WLANs 14-17 may each be internetworked with one or more of the cellular networks 19-21, 23 to provide cellular network access to the user equipment 12 via a WLAN 14-17. The particular cellular network(s) 19-21, 23 available to the user equipment 12 may thus be dependent upon which of the WLANs 14-17 is in communication with the user equipment 12. For example, in the illustrated wireless network, WLAN 1 (14) may provide the user equipment 12 with cellular access to either visited network 1 (19) or visited network 2 (20), WLAN 2 (15) may provide access to either the home network 23 or visited network 3 (21), WLAN 3 (16) may provide access to visited network 3 (21), and WLAN 4 (17) does not have access to any cellular networks that may be accessed by the user equipment 12. A more detailed description of a wireless network having WLANs 14-17 internetworked with cellular networks 19-21, 23 is provided in the standards document 3GPP TS 23.234, entitled "3GPP system to Wireless Local Area Network (WLAN) Interworking; System Description (Release 6)."

In the illustrated example 10, the user equipment 12 is within coverage range of four WLANs 14-17. In order to identify the WLANs 14-17 within its coverage range, the user equipment 12 may passively scan for WLAN beacon signals (e.g., SSIDs) or may actively scan the band for specific WLANs, for example by sending a probe request to solicit support from specific SSIDs. Once the available WLANs 14-17 are identified by the user equipment 12, the user equipment 12 determines which WLAN 14-17 to access using a list of preferred WLANs stored in memory on the user equipment 12. The list of preferred WLANs identifies the cellular networks 19-21, 23 available via each of the listed WLANs 14-17. Using information from the WLAN list, the user equipment 12 may select a WLAN 14-17 based on the available cellular networks 19-21, 23. For example, a WLAN 15 having access to the home network 23 may be selected over WLANs 14, 16 having access to only visited networks 19-21. Similarly, a WLAN 14 with access to a preferred visited network 19, 20 may be selected over a WLAN 21 with access to only a non-preferred visited network 21, and a WLAN 16 with access to a non-preferred visited network 21 may be selected over a WLAN 17 that may not be used to provide cellular access.

FIG. 2 illustrates an example WLAN list 30 that may be maintained on the user equipment 12. The WLAN list 30 identifies preferred WLANs 32 (e.g., preferred SSIDs) for a particular user equipment 12. The list of preferred WLANs 32 is preferably provisioned by the home network 23, and may also include a list of available WLANs preferred by the user equipment 12 operator. In addition, the WLAN list 30 identifies the cellular networks 34 (if any) that may be accessed via each of the preferred WLANs 32 in the list 32. For each available cellular network 34; the WLAN list 30 may include network identification information (NTW ID) 36 and a hierarchical preference status 38 for the particular network. The cellular network preference status 38 may be used to select a WLAN based on the desired (i.e., the most-preferred) cellular network 38. In the illustrated example, the order of preference for the available cellular networks 34 is HOME, PREFERRED, and NON-PREFERRED. For example, if the user equipment 12 is within coverage range of both WLAN 1 and WLAN 2, then the user equipment 12 may select WLAN 2 for short-range communications because the home network (i.e., the most-preferred cellular network) may be accessed via WLAN 2.

Figure 3:
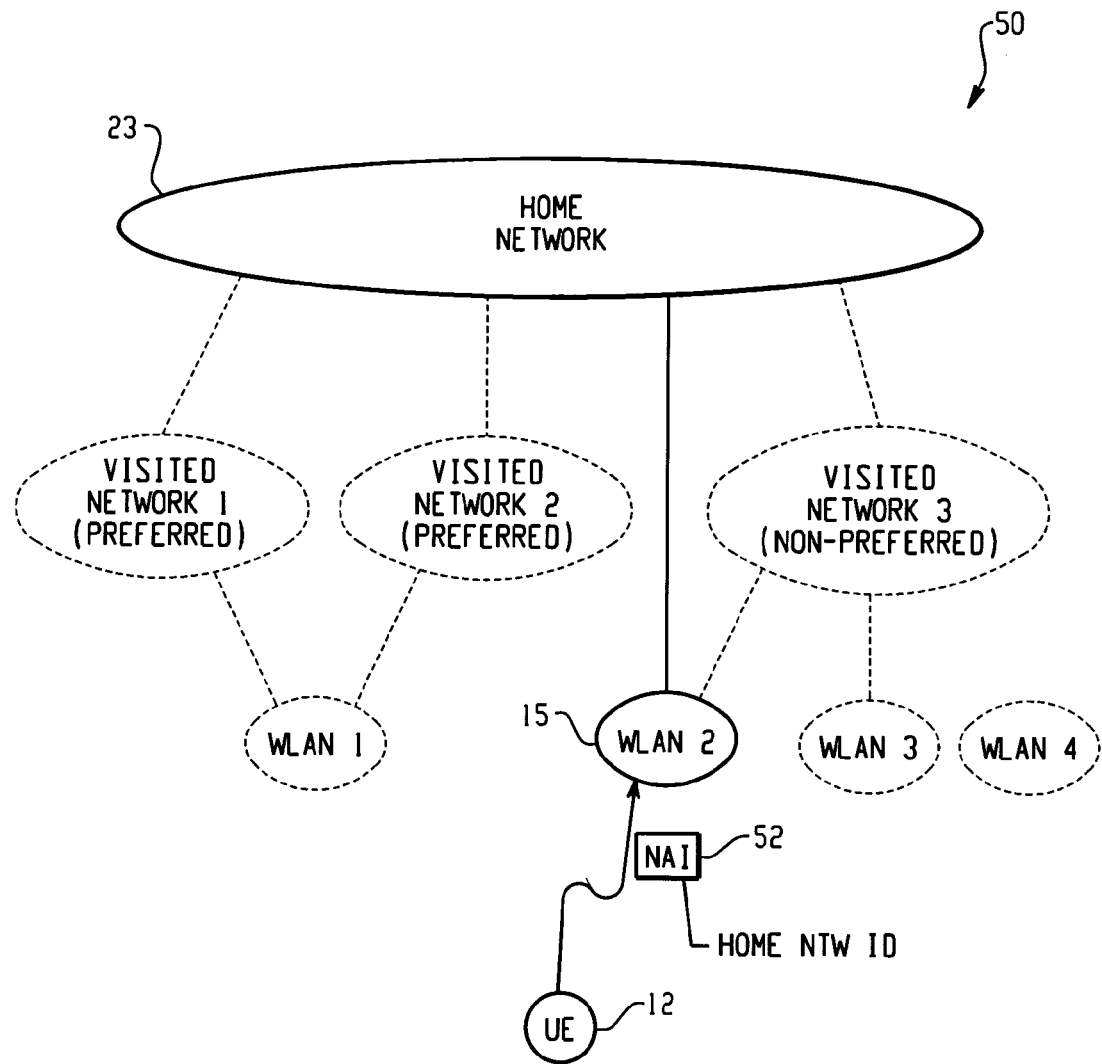
FIG. 3 illustrates an example of WLAN selection in the wireless network of FIG. 1 based on the example cellular network preferences of FIG. 2.

FIG. 3 illustrates an example of WLAN selection in the wireless network of FIG. 1 based on the example cellular network preferences of FIG. 2. Once the user equipment 12 has selected the most-preferred of the available WLANs based on its cellular network access (WLAN 2 in the illustrated example), the user equipment may initiate a network authentication procedure with the selected WLAN 15, for example by generating and transmitting a network access identifier (NAI) 52. The network authentication data (NAI) 52 may be constructed by the user equipment 12 to include the network identification information (NTW ID) for the selected cellular network 23. The network identification information (NTW ID) may, for example, include the mobile country code (MCC) and mobile network code (MNC) of the selected cellular network 23. The WLAN 15 may then use the network identification information to authenticate the user equipment with the selected cellular network 23. Upon successful authentication, the user equipment 12 may then communicate over the selected cellular network 23 via the WLAN 15.

If the selected WLAN 15 rejects the NAI 52, then the WLAN 15 may transmit information to the user equipment 12 indicating its available cellular networks. This may occur, for example, if the roaming agreements of the selected WLAN 15 have been changed since the preferred WLAN list 30 in the user equipment 12 was last provisioned. The updated list of available cellular networks from the WLAN 15 may be temporarily stored on the user equipment 12 until it is validated with the home network 23. The user equipment 12 may then either generate a new NAI 52 for the selected WLAN 15 based on the temporary list of available cellular networks received from the WLAN 15 or may select a different WLAN from its preferred WLAN list 30. If selecting from the temporary list of available cellular networks provided by the WLAN 15, then the user equipment 12 may determine from the preferred WLAN list 30 which is the most-preferred of the available cellular networks.

Figure 4:
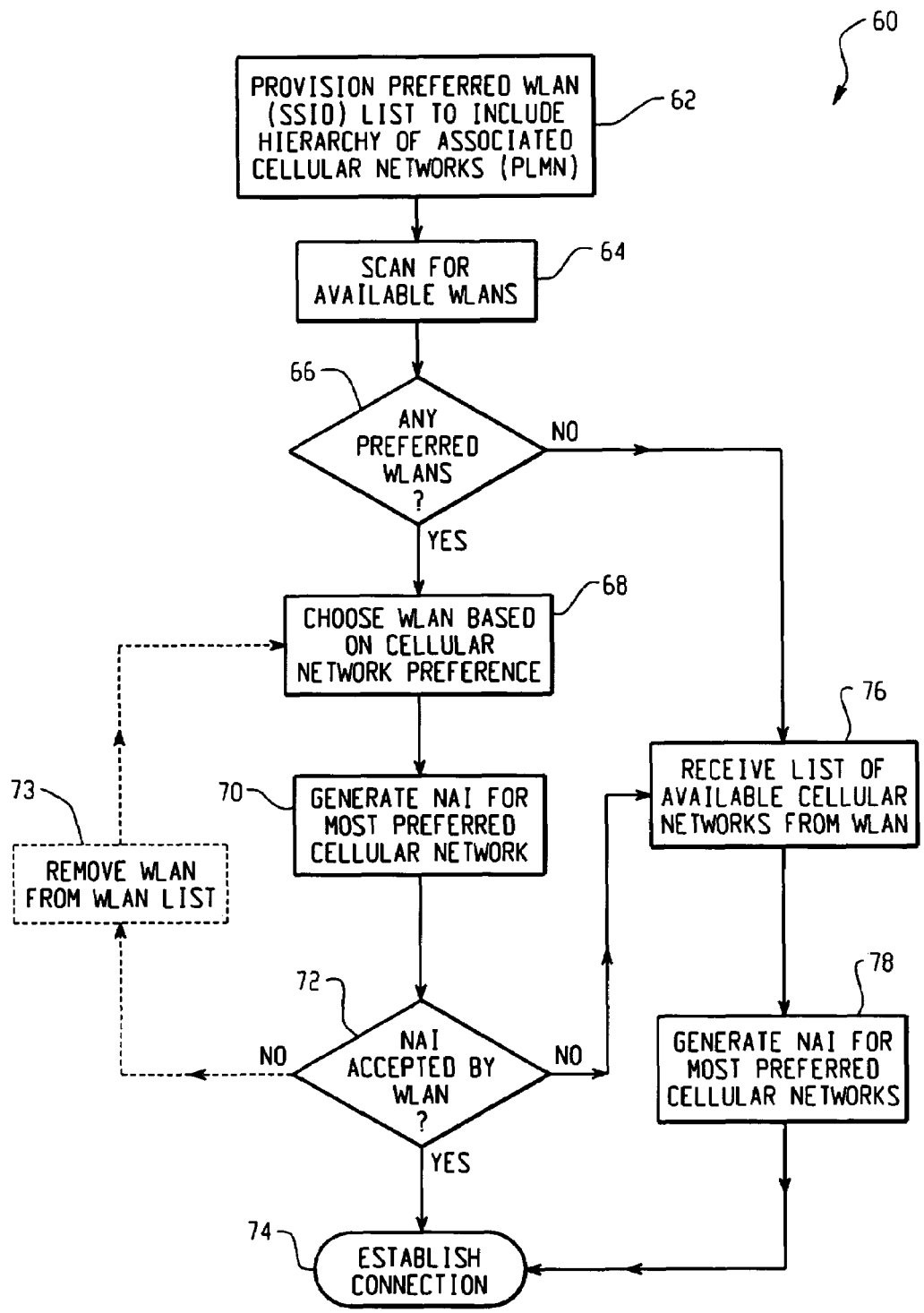
FIG. 4 is a flow diagram illustrating an example method for selecting a cellular network on a WLAN.

FIG. 4 is a flow diagram illustrating an example method 60 for selecting a cellular network on a WLAN. At step 62, the user equipment is provisioned to include a preferred WLAN list that identifies the cellular networks available for each WLAN, such as the WLAN list described above with reference to FIG. 2. After being activated, the user equipment scans (actively or passively) for available WLANs at step 64. At decision step 66, the method determines if any one or more WLANs from the preferred WLAN list are detected by the user equipment. If one or more preferred WLANs are detected at step 66, then the method proceeds to step 68. Else, if no preferred WLANs are detected, then the method proceeds to step 76.

At step 68, a WLAN is selected from the preferred WLANs detected in steps 64 and 66 based on the available cellular networks, as described above with reference to FIGS. 1-3. Network authentication data (e.g., NAI) is then generated at step 70 for authenticating the user equipment with the selected cellular network. At decision step 72, the method determines whether the network authentication data (NAI) is accepted by the selected WLAN. If so, then the user equipment is authenticated with the cellular network and a wireless communication link is established between the user equipment and the cellular network via the selected WLAN at step 74. Else, if the WLAN does not accept the network authentication data (NAI), then the method proceeds to step 76. Alternatively, if the WLAN does not accept the network authentication data (NAI), then the selected WLAN may be removed from the preferred WLAN list (e.g., until the WLAN list is re-provisioned by the home network) at step 73, and the method returns to step 68 to select another available WLAN from the preferred WLAN list 68.

If no preferred WLANs are available (steps 66 or 72), then at steps 76 and 78, the user equipment may select a cellular network from network information received from one or more WLAN within coverage range. At step 76, a list of available cellular networks is received from a WLAN. Network authentication data (e.g., NAI) is then generated at step 78 and transmitted to the WLAN to establish a communication link with one of the available cellular networks at step 74. A cellular network may, for example, be selected in step 78 using the cellular network preferences from the WLAN list 30.

Figure 5:
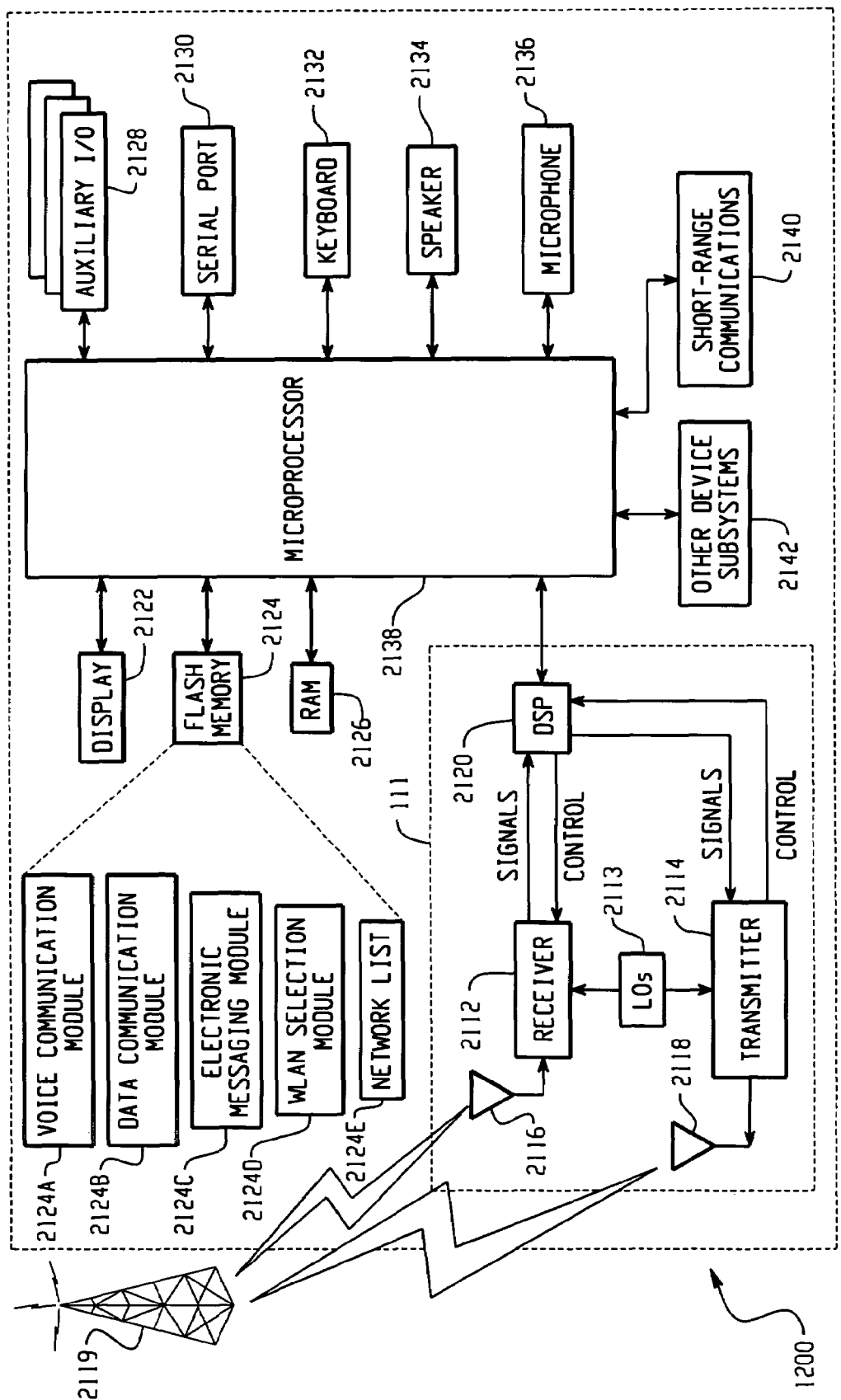
FIG. 5 is a block diagram illustrating an example mobile communication device.

FIG. 5 is a block diagram illustrating an example mobile communication device 2100. The mobile device 2100 includes a processing subsystem 2138, a communications subsystem 2111, a short-range communications subsystem 2140, a memory subsystem 2124, 2126, and various other device subsystems and/or software modules 2142. The mobile device 2100 also includes a user interface, which may include a display 2122, a serial port 2130, keyboard 2132, a speaker 2134, a microphone 2136, one or more auxiliary input/output devices 2128, and/or other user interface devices.

The processing subsystem 2138 controls the overall operation of the mobile device 2100. Operating system software executed by the processing subsystem 2138 may be stored in a persistent store, such as a flash memory 2124, but may also be stored in other types of memory devices in the memory subsystem, such as a read only memory (ROM) or similar storage element. In addition, system software, specific device applications, or parts thereof, may be temporarily loaded into a volatile store, such as a random access memory (RAM) 2126. Communication signals received by the mobile device 2100 may also be stored to RAM 2126.

The processing subsystem 2138, in addition to its operating system functions, enables execution of software applications 2124 on the device 2100. A predetermined set of applications that control basic device operations, such as data and voice communications, may be installed on the device 2100 during manufacture. For example, the device applications may include a WLAN selection module 2124D and a preferred WLAN list 2124E for selecting a WLAN and cellular network, as described above with reference to FIGS. 1-4.

Communication functions, including data and voice communications, are performed through the communication subsystem 2111, and possibly through the short-range communications subsystem 2140. The communication subsystem 2111 includes a receiver 2112, a transmitter 2114 and one or more antennas 2116, 2118. In addition, the communication subsystem 2111 also includes a processing module, such as a digital signal processor (DSP) 2120 or other processing device(s), and local oscillators (LOs) 2113. The specific design and implementation of the communication subsystem 2111 is dependent upon the communication network in which the mobile device 2100 is intended to operate. For example, a mobile device 2100 may include a communication subsystem 2111 designed to operate within the Mobitex™ mobile communication system, the DataTAC™ mobile communication system, a GSM network, a GPRS network, a UMTS network, and/or an EDGE network.

Network access requirements vary depending upon the type of communication system. For example, in the Mobitex and DataTAC networks, mobile devices are registered on the network using a unique personal identification number or PIN associated with each device. In UMTS and GSM/GPRS networks, however, network access is associated with a subscriber or user of a device. GPRS and UMTS devices therefore require a subscriber identity module, commonly referred to as a SIM or USIM card, in order to operate on a GSM/GPRS or UMTS network.

When required network registration or activation procedures have been completed, the mobile device 2100 may send and receive communication signals over the communication network 2119. Signals received by the antenna 2116 from the communication network 2119 are routed to the receiver 2112, which provides signal amplification, frequency down conversion, filtering, channel selection, etc., and may also provide analog to digital conversion. Analog-to-digital conversion of the received signal allows the DSP to perform more complex communication functions, such as demodulation and decoding. In a similar manner, signals to be transmitted to the network 2119 are processed (e.g., modulated and encoded) by the DSP 2120 and are then provided to the transmitter 2114 for digital to analog conversion, frequency up conversion, filtering, amplification and transmission to the communication network 2119 (or networks) via the antenna 2118.

In addition to processing communication signals, the DSP 2120 provides for receiver 2112 and transmitter 2114 control. For example, gains applied to communication signals in the receiver 2112 and transmitter 2114 may be adaptively controlled through automatic gain control algorithms implemented in the DSP 2120.

In a data communication mode, a received signal, such as a text message or web page download, is processed by the communication subsystem 2111 and input to the processing device 2138. The received signal is then further processed by the processing device 2138 for output to a display 2122, or alternatively to some other auxiliary I/O device 2128. A device user may also compose data items, such as e-mail messages, using a keyboard 2138 and/or some other auxiliary I/O device 2128, such as a touchpad, a rocker switch, a thumb-wheel, or some other type of input device. The composed data items may then be transmitted over the communication network 2119 via the communication subsystem 2111.

In a voice communication mode, overall operation of the device is substantially similar to the data communication mode, except that received signals are output to a speaker 2134, and signals for transmission are generated by a microphone 2136. Alternative voice or audio I/O subsystems, such as a voice message recording subsystem, may also be implemented on the device 2100. In addition, the display 2122 may also be utilized in voice communication mode, for example, to display the identity of a calling party, the duration of a voice call, or other voice call related information.

The short-range communications subsystem 2140 enables communication between the mobile device 2100 and other proximate systems or devices, which need not necessarily be similar devices. For example, the short-range communications subsystem 2140 may include an infrared device and associated circuits and components, or a Bluetooth™ communication module to provide for communication with similarly-enabled systems and devices.

This written description uses examples to disclose the invention, including the best mode, and also to enable a person skilled in the art to make and use the invention. The patentable scope of the invention may include other examples that occur to those skilled in the art.

It is claimed:

1. A method for selecting a cellular network on a wireless local area network (WLAN), comprising:
   identifying a plurality of WLANs within coverage range of a mobile device;
   for each of the identified WLANs, determining if one or more cellular networks may be accessed via the WLAN;
   identifying a most preferred cellular network from the cellular networks that may be accessed via the identified WLANs;
   selecting one of the identified WLANs that may be used to access the most preferred cellular network; and
   designating the most preferred cellular network for access by the mobile device via the selected WLAN.

2. The method of claim 1, further comprising:
   provisioning a list of preferred WLANs that identifies the cellular network that may be accessed via each of the preferred WLANs; and
   selecting the one of the identified WLANs from the list of preferred WLANs.

3. The method of claim 1, further comprising:
   generating network authentication data that identifies the most preferred cellular network;
   transmitting the network authentication data to the WLAN; and
   using the network authentication data to establish a communication link with the most preferred cellular network.

4. The method of claim 2, further comprising:
   attempting to establish a communication link with the most preferred cellular network via the selected WLAN; and
   if the attempt is unsuccessful, then selecting another of the identified WLANs from the list of the preferred WLANs.

5. The method of claim 2, further comprising:
   attempting to establish a communication link with the most preferred cellular network via the selected WLAN; and
   if the attempt is unsuccessful, then receiving a list of available cellular networks from the selected WLAN and designating one of the cellular networks from the list of available cellular networks for access by the mobile device.

6. A mobile device for use in a wireless network, the wireless network including a plurality of wireless local area networks (WLANs) and a plurality of cellular networks, each of the WLANs being interfaced with one or more of the cellular networks, the mobile device comprising:
   a memory subsystem;
   a communication subsystem operable to transmit and receive data over the wireless network;
   a processing subsystem coupled to the memory subsystem and the communication subsystem and operable to store and retrieve data in the memory subsystem, to execute instructions stored in the memory subsystem, and to cause the communication subsystem to transmit and receive data over the wireless network;
   a network list stored in the memory subsystem, the network list identifying a plurality of preferred WLANs for access by the mobile device, the network list further identifying one or more cellular networks that may be accessed via the preferred WLANs; and a WLAN selection module stored in the memory subsystem and executed by the processing subsystem and comprising instructions operable to cause the mobile device to identify a plurality of WLANs within coverage range of the mobile device, identify a most preferred cellular network from the network list that may be accessed via one of the plurality of WLANs within coverage range of the mobile device, and generating network authentication data for use in establishing a communication link with the most preferred cellular network.

7. The mobile device of claim 6, wherein the cellular networks identified by the network list include one or more of a home network, a preferred visited network, and a non-preferred visited network.

8. The mobile device of claim 7, wherein the network list includes a preference status for each of the identified cellular networks that indicates whether the cellular network is a home network, a preferred visited network, or a non-preferred visited network.

9. The mobile device of claim 8, wherein the WLAN selection module identifies the most preferred cellular network from the network list based on the preference status of the cellular networks.

10. The mobile device of claim 6, wherein the network list includes a list of service set identifiers (SSIDs) to identify the plurality of preferred WLANs.

11. The mobile device of claim 10, wherein one or more of the listed SSIDs include a list of one or more public land mobile networks (PLMNs) to identify the one or more cellular networks that may be accessed via the SSID.

12. The mobile device of claim 6, wherein the network list is provisioned by a home cellular network.

13. The mobile device of claim 6, wherein the WLAN selection module identifies the plurality of WLANs within coverage range of the mobile device by passively scanning for beacon signals from the WLANs.

14. The mobile device of claim 6, wherein the WLAN selection module identifies the plurality of WLANs within coverage range of the mobile device by actively scanning for beacon signals from the preferred WLANs identified by the network list.

15. The mobile device of claim 6, wherein the WLAN selection module establishes a communication link with the most preferred cellular network by generating a network access identifier (NAI) that includes network identification information for the most preferred cellular network and transmitting the NAI to the one of the plurality of WLANs with access to the most preferred cellular network.

16. The mobile device of claim 15, wherein the NAI identifies a mobile country code (MCC) and a mobile network code (MNC) for the most preferred cellular network.

17. A mobile device for use in a wireless network, the wireless network including a plurality of wireless local area networks (WLANs) and a plurality of cellular networks, each of the WLANs being interfaced with one or more of the cellular networks, the mobile device comprising:

means for storing a network list, the network list identifying a plurality of preferred WLANs for access by the mobile device, the network list further identifying one or more cellular networks that may be accessed via the preferred WLANs;

means for identifying a plurality of WLANs within coverage range of the mobile device;

means for identifying a most preferred cellular network from the network list that may be accessed via one of the plurality of WLANs within coverage range of the mobile device; and means for generating network authentication data for use in establishing a communication link with the most preferred cellular network.

18. The mobile device of claim 17, wherein the means for identifying a plurality of WLANs operates by passively scanning for beacon signals from the WLANs.

19. The mobile device of claim 17, wherein the means for identifying a plurality of WLANs operates by actively scanning for beacon signals from the WLANs.

20. The mobile device of claim 17, wherein the means for identifying a plurality of WLANs operates by actively scanning for beacon signals from the preferred WLANs identified by the network list.

* * * * *

UNITED STATES PATENT AND TRADEMARK OFFICE
CERTIFICATE OF CORRECTION

| | | |
|---|---|---|
| PATENT NO. | : 7,610,014 B2 | Page 1 of 1 |
| APPLICATION NO. | : 10/752802 | |
| DATED | : October 27, 2009 | |
| INVENTOR(S) | : Adrian Buckley | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 518 days.

Signed and Sealed this

Fourteenth Day of December, 2010

David J. Kappos
*Director of the United States Patent and Trademark Office*